(12) United States Patent
Truong

(10) Patent No.: US 11,517,498 B2
(45) Date of Patent: Dec. 6, 2022

(54) SYSTEM, DEVICES, AND METHODS FOR LONG LASTING LIP PLUMPING

(71) Applicant: L'Oreal, Paris (FR)

(72) Inventor: Lily Truong, Redmond, WA (US)

(73) Assignee: L'OREAL, Paris (FR)

( * ) Notice: Subject to any disclaimer, the term of this patent is extended or adjusted under 35 U.S.C. 154(b) by 337 days.

(21) Appl. No.: 16/697,867

(22) Filed: Nov. 27, 2019

(65) Prior Publication Data

US 2021/0154091 A1 May 27, 2021

(51) Int. Cl.
*A61H 23/00* (2006.01)
*A61H 23/02* (2006.01)
*A61H 23/04* (2006.01)
*G06T 11/60* (2006.01)
(Continued)

(52) U.S. Cl.
CPC ......... *A61H 23/006* (2013.01); *A61H 23/004* (2013.01); *A61H 23/02* (2013.01); *A61H 23/04* (2013.01); *G06T 11/60* (2013.01); *G09B 19/24* (2013.01); *A61H 2201/501* (2013.01); *A61H 2201/5023* (2013.01); *A61H 2205/022* (2013.01); *G06F 3/0482* (2013.01)

(58) Field of Classification Search
CPC ........ A61H 23/00–06; A61H 2023/002–0045; A61H 2201/0153; A61H 2201/0157; A61H 2201/50–5012; A61H 2205/022–026; A61H 39/00–086; A61H 2039/005; A61H 7/00–008; A61H 2007/009; A61H 9/00–0057; A61H 2009/0014–0064; G06T 11/60; G09B 19/24; G06F 3/0482

USPC .......................................................... 601/108
See application file for complete search history.

(56) References Cited

U.S. PATENT DOCUMENTS

2007/0243150 A1\* 10/2007 Bottiglieri ............ A61K 8/4973
424/70.13
2008/0200848 A1\* 8/2008 Avni ...................... A61M 11/00
601/46
2013/0110014 A1 5/2013 Luzon et al.
(Continued)

FOREIGN PATENT DOCUMENTS

DE 20 2007 001473 U1 4/2007
DE 202007001473 U1 \* 4/2007 ............. A61H 23/02
(Continued)

OTHER PUBLICATIONS

Translation of DE 202007001473 accessed from Espacenet on Dec. 8, 2021. (Year: 2007).\*
(Continued)

*Primary Examiner* — Valerie L Woodward
*Assistant Examiner* — Paige Kathleen Bugg
(74) *Attorney, Agent, or Firm* — Christensen O'Connor Johnson Kindness PLLC

(57) ABSTRACT

A lip plumping device includes a positive pressure device having a striking rod and striking head attached on the an end of the striking rod; a force-generating element to propel the striking head with energy which upon impacting on a target spot on a lip or in an area around the lip increases blood flood to the target spot on the lip or in the area around the lip which produces a lip plumping effect; and a button that controls the force-generating element. The target spot and a striking force of the positive pressure device is controlled by instructions from a computing device.

18 Claims, 4 Drawing Sheets

(51) Int. Cl.
    *G09B 19/24* (2006.01)
    *G06F 3/0482* (2013.01)

(56) References Cited

U.S. PATENT DOCUMENTS

| | | | |
|---|---|---|---|
| 2013/0158447 A1* | 6/2013 | Shabazian | A61H 23/0263 |
| | | | 601/46 |
| 2013/0237751 A1 | 9/2013 | Alexander | |
| 2015/0342825 A1 | 12/2015 | Shabazian et al. | |
| 2018/0151086 A1* | 5/2018 | Belhassen | A45D 44/005 |
| 2019/0001033 A1 | 1/2019 | George et al. | |

FOREIGN PATENT DOCUMENTS

| | | | |
|---|---|---|---|
| WO | 2019/023549 A1 | 1/2019 | |
| WO | WO-2019023549 A1 * | 1/2019 | A45D 44/22 |

OTHER PUBLICATIONS

International Search Report and Written Opinion dated Feb. 22, 2021, issued in corresponding International Application No. PCT/US2020/059374, filed Nov. 6, 2020.

* cited by examiner

SYSTEM, DEVICES, AND METHODS FOR LONG LASTING LIP PLUMPING

SUMMARY

In one embodiment, a miniature linearly actuated positive pressure device with a striking head is used to deliver enough mechanical energy to the capillary beds connected to the labial artery within the lip to induce the inflammatory response to achieve a lip plumping effect.

In one embodiment, the miniature linearly actuated positive pressure device is shaped like a lipstick case.

In one embodiment, the miniature linearly actuated positive pressure device is powered by a spring, compressed air or gas, or an electric actuator that with a click of a button will unload the striking head to target a specific area of the lips or around the lips. The body response drives increased blood flow leading to swelling in the affected lip area, thereby increasing lip volume in that affected area for a prolonged period of time.

The miniature positive pressure device is precisely controlled to be within an effective range, such that the striking force is high enough to offer lasting effects but not too high that may cause discomfort or injury.

In one embodiment, the miniature positive pressure device has several different spring loaded conditions to enable different levels of plumping effects (i.e., basic plump, high plump, super plump).

In one embodiment, the plumping effects could be further augmented by applying additional lip plumping gloss formula on top of the lips after treatment.

The miniature positive pressure device delivers long lasting lip plumping effects by internally increasing blood flow for lip plumping, which has longer lasting effects as compared to the visual plumping effects afforded by the lip plumping glosses.

In one embodiment, the miniature lip plumping device could be connected to an app that lets the user browse through different lip plumping looks and guides on where to apply the device.

In one embodiment, a lip plumping device includes: a positive pressure device having a striking rod and striking head attached on an end of the striking rod; a force-generating element to propel the striking head with energy which upon impacting on a target spot on a lip or in an area around the lip increases blood flood to the target spot on the lip or in the area around the lip which produces a lip plumping effect; and a button that controls the force-generating element.

In one embodiment, the force-generating element is a spring, a compressed air or gas cartridge, or an electromagnetic actuator.

In one embodiment, the force-generating element has settings to vary the force generated.

In one embodiment, the lip plumping device comprises a communications module and a computing system.

In one embodiment, the lip plumping device comprises a dial to increase and decrease a striking force of the striking head.

In one embodiment, a striking force of the positive pressure device is controlled by instructions from a computing device.

In one embodiment, a computer-implemented method of plumping a lip, the method comprises: creating, by a computing device, a pre-altered lip style of a user; creating, by the computing device, a plurality of lip styles; creating, by the computing device, a questionnaire in which the user selects at least one lip style from the plurality of lip styles; and providing, by the computing device, instructions for a plumping device how to plump the pre-altered lip style of the user to resemble the lip style selected by the user.

In one embodiment, the instructions include at least one of target spot and striking force.

In one embodiment, the instructions are presented as a graphical image of the target spots.

In one embodiment, the plurality of lip styles are recommend by the computing device based on one or more photos of the pre-altered lip style of the user.

In one embodiment, the computer-implemented method further comprises providing recommendations based in real-time video of the user.

In one embodiment, the pre-altered lip style of the user is compared to the plurality of lip styles by the computing device.

In one embodiment, a computing device, comprising at least a memory and processor, is configured to: create a pre-altered lip style of a user; create a plurality of lip styles; create a questionnaire in which the user selects at least one lip style from the plurality of lip styles; and provide instructions for a plumping device how to plump the pre-altered lip style of the user to resemble the lip style selected by the user.

In one embodiment, the instructions include at least one of target spot and striking force.

In one embodiment, the instructions are presented as a graphical image of the target spots.

In one embodiment, the plurality of lip styles are recommend by the computing device based on one or more photos of the pre-altered lip style of the user.

In one embodiment, the computing device is further configured to provide recommendations in real-time video of the user.

In one embodiment, the pre-altered lip style of the user is compared to the plurality of lip styles by the computing device.

In one embodiment, a system includes: a lip style analysis engine including computational circuitry configured to create a pre-altered lip style of a user and a plurality of lip styles; a questionnaire analysis engine including computational circuitry configured to provide a selection of at least one lip style from the plurality of lip styles; and an instruction engine including computational circuitry configured to provide instructions for a plumping device how to plump the pre-altered lip style of the user to resemble the lip style selected by the user.

In one embodiment, the instructions include at least one of target spot and striking force.

In one embodiment, the instructions are presented as a graphical image of the target spots.

In one embodiment, the system further comprises a recommendation engine including computational circuitry configured to make recommendations of lip styles based on one or more photos of the pre-altered lip style of the user.

In one embodiment, the system further comprises a recommendation engine including computational circuitry configured to make recommendations based in real-time video of the user.

In one embodiment, the pre-altered lip style of the user is compared to the plurality of lip styles by the computing device This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The disclosure is related to devices and methods for augmenting the lips to give more fuller-looking lips. Lip augmentation is a popular cosmetic technique. There are various ways of augmenting lips including the use of filler injections of hyaluronic acid, fat, and collagen. However, the effects of filler injections are only temporary, and may require a visit to a clinic where the procedure is performed by a plastic surgeon. More permanent lip augmentation is available through the use of lip implants. However, lip implants are a surgical procedure.

Topically applied "lip plumping glosses" have been introduced for a long time as an alternative to the more expensive filler injections and implants, and do not require a visit to a clinic or a plastic surgeon. The lip plumping glosses may include actives, such as peppermint, *capsicum*, and more recently, hyaluronic acid and derivatives.

Lip plumping glosses are not long lasting and applied uniformly across the entire lip area. This does not give much control to achieve a certain type of look to the lips. In practice, this drawback of lip plumping glosses is overcome by filler injections, since plastic surgeons can achieve different types of plumped lip looks by specifically targeting the addition of fillers to specific key areas of the lip, not uniformly. Accordingly, there is need for a non-surgical method of creating plumped lips that are targeted to specific areas of the lips.

This disclosure relates to a non-surgical method of plumping lips that can provide advantages over both the lip plumping glosses and the filler injections. In one embodiment, the disclosure enables lip plumping that can closely mimic the approach taken in the clinician's office to selectively target specific lip areas, while offering a safer and effective mechanical treatment to induce lip plumping that is longer lasting than the topical glosses.

Figure 1:
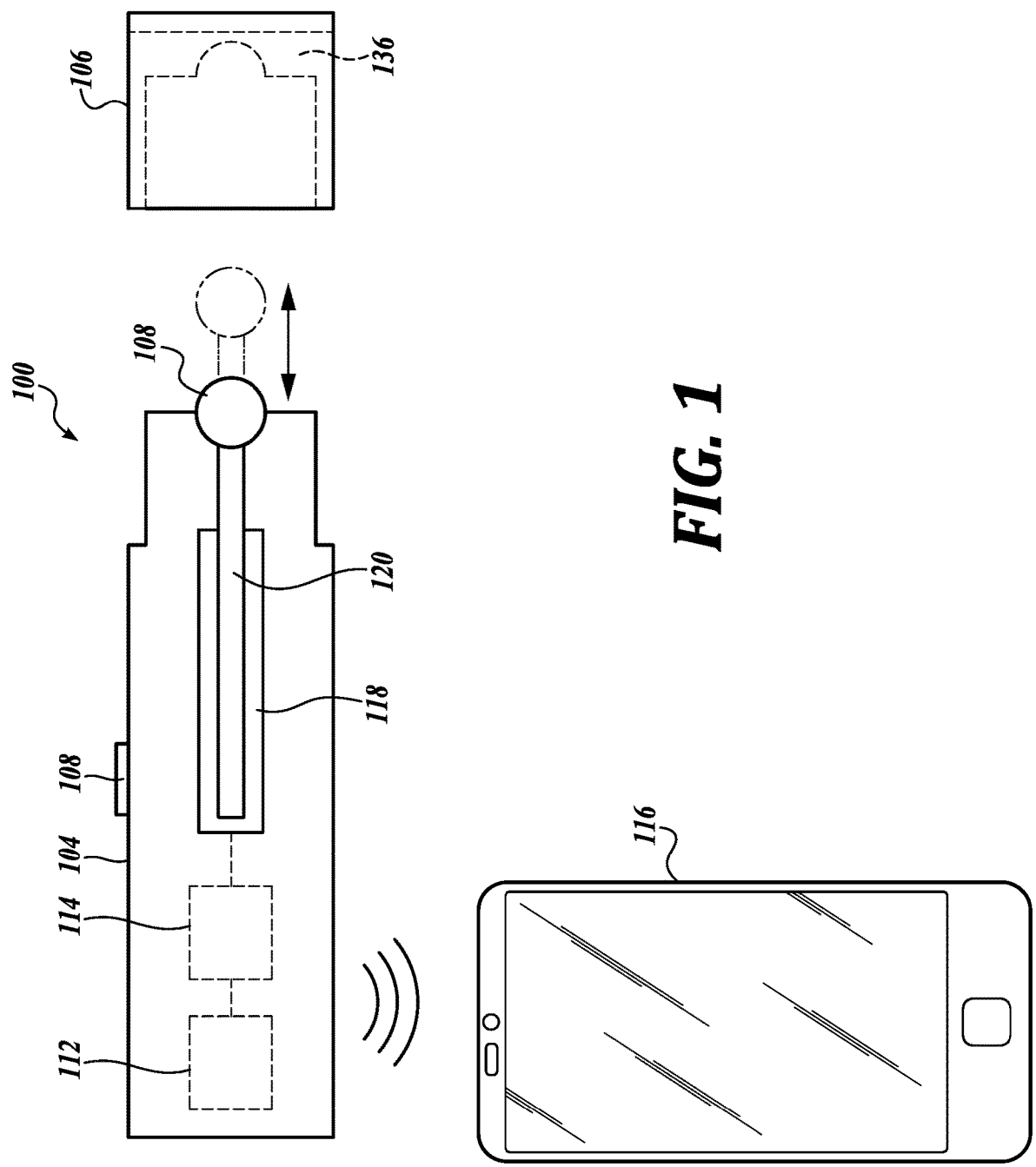
FIG. 1 is a diagrammatical illustration of lip plumping device.

Referring to FIG. 1, a lip plumping device 100 is housed in a case 104. In one embodiment, the size of the case 104 is similar to a conventional lipstick case to allow the lip plumping device 100 to be carried on one's clothing, person, or in carried accessories, such as a handbag, wallet, or purse. The case 104 houses a miniature positive pressure device 118. The positive pressure device 118 includes a linear actuated striking rod 120 and a striking head 102 attached to the distal end of the striking rod 120. In one embodiment, the striking portion of the striking head 102 is round; however, the striking head 120 can be interchangeable with different shaped striking heads. In one embodiment, for example, a set of a plurality of striking heads is provided, each one having a progressively smaller striking portion.

A cap 106 is provided to cover the striking head 120 while not in use. The cap 106 can include a dispenser 136, such as a sponge or roller ball for dispensing lip plumping gloss to the striking head 120. In this way, lip plumping is achieved via the striking head 120 and the addition of lip plumping gloss. The lip plumping gloss can be a conventional lip plumping gloss including one or more lip plumping actives The force to linearly propel the striking rod 120 and striking head 102 can be generated by a compression spring, compressed air or gas cartridge, or an electro-magnetic actuator. A suitable effective striking force is a force that can increase the blood flow to the targeted area to induce a natural swelling effect.

The striking rod 120 and striking head 102 are in the loaded position when retracted into the case 104. A button 108 is provided that will unload a force to propel the striking rod 120 and striking head 102 linearly forward. In the process of unloading, the striking head 102 will make contact with a lip or lip area to increase blood flow to the area to achieve lip plumping. In one embodiment, the same button 108 for unloading the striking head 102, can also be a force regulating dial by turning the button 108 clockwise and counter clockwise for greater or lesser striking force. The button 108 can be have pre-set force settings.

In one embodiment, the miniature positive pressure device 100 further includes a communications module 112 and a computer system 114. In one embodiment, the positive pressure device 100 can be controlled by downloading instructions, such as through a mobile computing device 116. Such instructions can be used to control the amount of striking force or the stroke length of the striking rod 120 and striking head 102. Additional instructions, such as pictures or photos where the lip plumping device 100 should be positioned on the lip or lip area can be presented to a user on a display of the mobile computing device 116. Such instructions for controlling the parameters of the positive pressure device 100 are aimed at achieving a specific plumping effect. Both the communications module 112 and computer system 114 can include other components as herein described.

Figure 2:
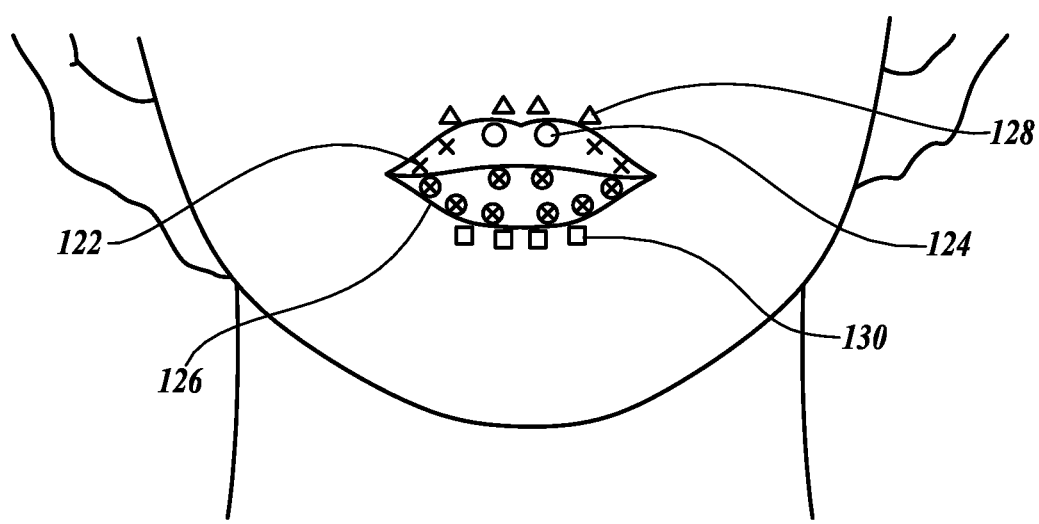
FIG. 2 is a diagrammatical illustration of a display screen for instruction a user how to create several distinct plumped lip effects.

FIG. 2 is a diagrammatical illustration of a graphical image that may appear on the display of mobile computing device 116 for instructing a user where to place the striking head 102 of the positive pressure device 100. The image is meant to represent more than one different lip plumping styles. The instructions for plumping may depend on a user selected lip plumping style. In FIG. 2, various lip plumping styles are represented. For example, "Xs" 122 indicate target spots for plumping the outer upper lip, circles "0" indicate target spots for plumping the central upper lip, and circles with Xs 126 indicate target spots for plumping the entire lower lip.

In one embodiment, the target spots can includes areas not on the lips, but close to the lips. For example, triangles 128 indicate target spots above the upper lip, and squares 130 indicate target spots below the lower lip.

Furthermore, in one embodiment, not only the location of target striking spots is indicated, but also the striking force, such as high, medium, or low striking force. The degree of striking force can be represented by color, for example, by using increasing darkness for greater striking force and lighter for lesser striking force.

There are a plurality of operational options for the lip plumping device 100 when connected to a computing device 116. In one embodiment, the user can receive a free set of instructions for a basic lip plumping style. In one embodiment, the user can receive upgrades to the basic plan by paying for additional instructions in order to access additional lip plumping style instructions. In one embodiment, all the options become available upon purchase of the lip plumping device. In one embodiment, all the options become available to user upon the purchase of an "app" or "application" which resides on the computing device 116. In one embodiment, the app on the mobile computing device is used to get recommendations and/or instructions to achieve a certain plumping effect. In one embodiment, the app may ask the user for certain preferences, and the user is provided with recommendations for lip plumping styles. In one embodiment, the user can select from certain lip plumping styles or a lip plumping style can be recommended to the user based on responses to a questionnaire and photos of the pre-altered lip style of the user.

Figure 3:
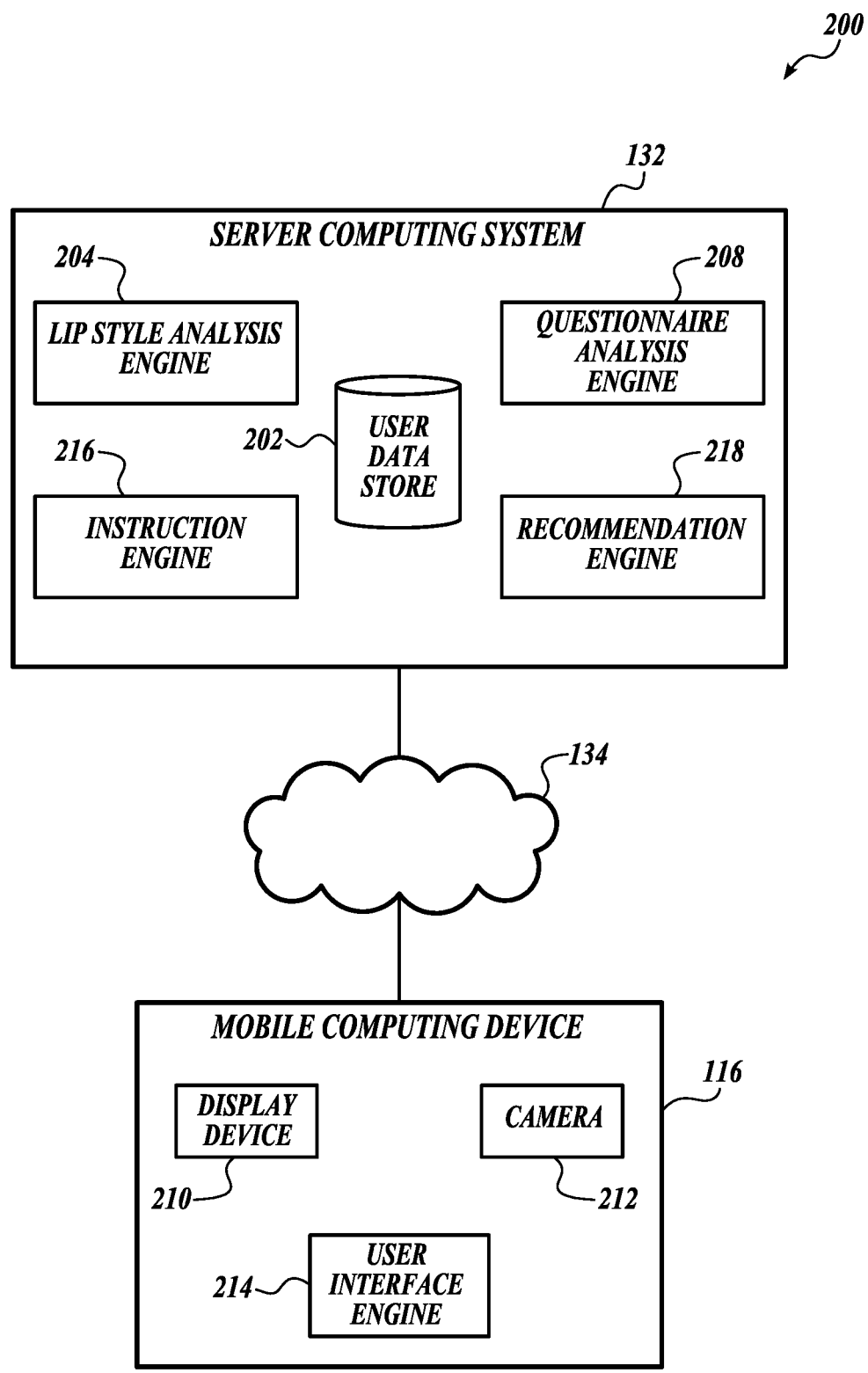
FIG. 3 is a block diagram that illustrates a non-limiting example embodiment of a system that includes a mobile computing device and a server computing system according to various aspects of the present disclosure.

FIG. 3 is a block diagram that illustrates a non-limiting example embodiment of a system that includes a mobile computing device 116 and a server computing device 132 according to various aspects of the present disclosure.

In some embodiments, the mobile computing device 116 may be a smartphone. In some embodiments, the mobile computing device 116 may be any other type of computing device having the illustrated components, including but not limited to a tablet computing device or a laptop computing device. In some embodiments, the mobile computing device 116 may not be mobile, but may instead by a stationary computing device such as a desktop computing device. In some embodiments, the illustrated components of the mobile computing device 116 may be within a single housing. In some embodiments, the illustrated components of the mobile computing device 116 may be in separate housings that are communicatively coupled through wired or wireless connections (such as a laptop computing device with an external camera connected via a USB cable). The mobile computing device 116 also includes other components that are not illustrated, including but not limited to one or more processors, a non-transitory computer-readable medium, a power source, and one or more communication interfaces.

As shown, the mobile computing device includes a display device 210, a camera 212, and a user interface engine 214.

In some embodiments, the display device 210 is an LED display, an OLED display, or another type of display for presenting a user interface. In some embodiments, the display device 210 may be combined with or include a touch-sensitive layer, such that a subject 102 may interact with a user interface presented on the display device 210 by touching the display. In some embodiments, a separate user interface device, including but not limited to a mouse, a keyboard, or a stylus, may be used to interact with a user interface presented on the display device 210.

In some embodiments, the user interface engine 214 is configured to present a user interface on the display device 210, including presenting at least one questionnaire for collecting information from the user. In some embodiments, the user interface engine 214 may be configured to use the camera 212 to capture images of the user in order to determine the pre-altered lip style of the user.

In some embodiments, the camera 212 is any suitable type of digital camera that is used by the mobile computing device 116. In some embodiments, the mobile computing device 104 may include more than one camera 212, such as a front-facing camera and a rear-facing camera.

In some embodiments, the server computing system 132 includes one or more computing devices that each include one or more processors, non-transitory computer-readable media, and network communication interfaces that are collectively configured to provide the components illustrated. In some embodiments, the one or more computing devices that make up the server computing system 132 may be rack-mount computing devices, desktop computing devices, or computing devices of a cloud computing service.

As shown, the server computing system 132 includes a user data store 202, a lip style analysis engine, a questionnaire engine 208, a recommendation engine, and an instruction engine 216.

In some embodiments, the user data store 202 is configured to store records for each user that uses the system 200. The records may include the pre-altered lip style, at least one image, responses to a questionnaire, previous lip styles selected, and/or other information collected or determined by the system 200.

In some embodiments, the lip style analysis engine 204 may be configured to process an image of a lip from a photo of the user in order to determine the pre-altered lip style of the user. In some embodiments, the lip style analysis engine 204 may be further configured to compare the pre-altered lip style of the user to a lip style that is selected by the user or recommended by the recommendation engine.

In some embodiments, the questionnaire analysis engine 208 may be configured to receive responses to a questionnaire from the user and any photos. The responses and photos to the questionnaire may determine the best lip style that is suited for the user.

In some embodiments, the recommendation engine 218 provides lip plumping style recommendations to the user based on the responses to the questionnaire. In some embodiments, the recommendations can be in the form of pictures showing various lip plumping styles.

In some embodiments, the instruction engine 216 may be configured to generate lip plumping instructions so as to modify the pre-altered lip style into the selected lip style. Instructions can indicate the specific location spots where to place the lip plumping device 100 as well as the striking force setting, such as high, medium, or low striking force.

"Engine" refers to logic embodied in hardware or software instructions, which can be written in a programming language, such as C, C++, COBOL, JAVA™, PHP, Perl, HTML, CSS, JavaScript, VBScript, ASPX, Microsoft .NET™, Go, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

"Data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

A method for plumping lips may, for example, begin by the user starting an app on the mobile computing device 116. The method may then present a questionnaire generated by the questionnaire analysis engine 208 on the server computing device 132. The questionnaire may ask for the user to take one or more photos, full-on or side photos of the present pre-altered lips. The questionnaire may ask questions relating to the lip style desired.

In one embodiment, the responses and photos are transmitted to the server computing system 132. In one embodiment, the responses are analyzed by the recommendation engine 218. Then, the recommendation engine 218 transmits the recommendations to the user. Then, the user can select from the recommendations. In one embodiment, one way of recommending a lip style for the user is to overlay different styles of lips on the photos taken by the user or overlayed in real-time on the user's live video. In one embodiment, recommendations are provided based on real-time video of the user. In this embodiment, the user could be guided or "coached" in real time rather than an asynchronous approach in which the user has to take a photo, send it in, get feedback and recommendations based on that photo, do the treatment, then take another photo and send it in to check if it was done correctly.

In one embodiment, the recommendation engine 218 may use preferences and/or feedback provided by other users with similar responses to determine the lip styles to recommend. When the user sees the recommend lip styles based on the questionnaire, the user may select a lip style. Alternatively, recommendations do not need to be generated. In one embodiment, the questionnaire includes a plurality of lip styles from which the user may select the desired lip style without being presented with recommendations.

Next, the selected lip style is transmitted to the server computing system 132. In one embodiment, the lip style analysis engine 204 can compare the photos of the pre-altered lip to the selected lip style and determine the physical differences. For example, the desired lip style is overlaid over the pre-altered lip style to determine the physical differences. The instruction engine 216 can convert the physical differences between the pre-altered lip style to the selected lip style into instructions for determining the treatment parameters, for example, the striking target spot, the number of strikes, and the force of the strikes to result in plumping of the pre-altered lip so that the resulting lip will resemble the selected lip style.

Each time the user downloads instructions, the instructions may be stored in the user data store 202.

The mobile computing device 116 and the server computing system 132 may communicate via a network 134. The network 134 may include any suitable networking technology, including but not limited to a wireless communication technology (including but not limited to Wi-Fi, WiMAX, Bluetooth, 2G, 3G, 4G, 5G, and LTE), a wired communication technology (including but not limited to Ethernet, USB, and FireWire), or combinations thereof.

Figure 4:
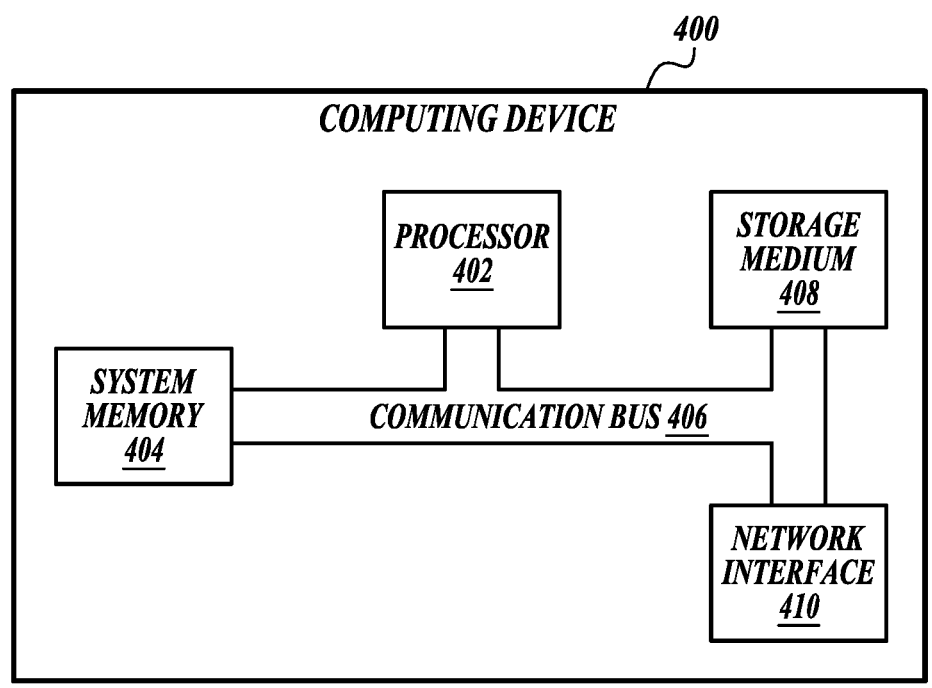
FIG. 4 is a block diagram that illustrates a non-limiting example embodiment of a computing device appropriate for use as a computing device with embodiments of the present disclosure

FIG. 4 is a block diagram that illustrates aspects of an exemplary computing device 400 appropriate for use as a computing device of the present disclosure. While multiple different types of computing devices were discussed above, the exemplary computing device 400 describes various elements that are common to many different types of computing devices. While FIG. 4 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 400 may be any one of any number of currently available or yet to be developed devices.

In its most basic configuration, the computing device 400 includes at least one processor 402 and a system memory 404 connected by a communication bus 406. Depending on the exact configuration and type of device, the system memory 404 may be volatile or nonvolatile memory, such as read only memory ("ROM"), random access memory ("RAM"), EEPROM, flash memory, or similar memory technology. Those of ordinary skill in the art and others will recognize that system memory 404 typically stores data and/or program modules that are immediately accessible to and/or currently being operated on by the processor 402. In this regard, the processor 402 may serve as a computational center of the computing device 400 by supporting the execution of instructions.

As further illustrated in FIG. 4, the computing device 400 may include a network interface 410 comprising one or more components for communicating with other devices over a network. Embodiments of the present disclosure may access basic services that utilize the network interface 410 to perform communications using common network protocols. The network interface 410 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 410 illustrated in FIG. 4 may represent one or more wireless interfaces or physical communication interfaces described and illustrated above with respect to particular components of the computing device 400.

In the exemplary embodiment depicted in FIG. 4, the computing device 400 also includes a storage medium 408. However, services may be accessed using a computing device that does not include means for persisting data to a local storage medium. The storage medium 408 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 404 and storage medium 408 depicted in FIG. 4 are merely examples of computer-readable media.

Suitable implementations of computing devices that include a processor 402, system memory 404, communication bus 406, storage medium 408, and network interface 410 are known and commercially available. For ease of illustration and because it is not important for an understanding of the claimed subject matter, FIG. 4 does not show some of the typical components of many computing devices. In this regard, the computing device 400 may include input devices, such as a keyboard, keypad, mouse, microphone, touch input device, touch screen, tablet, and/or the like. Such input devices may be coupled to the computing device 400 by wired or wireless connections including RF, infrared, serial, parallel, Bluetooth, Bluetooth low energy, USB, or other suitable connections protocols using wireless or physical connections. Similarly, the computing device 400 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A lip plumping device, comprising:
    a positive pressure device having a striking rod and a striking head attached on an end of the striking rod;
    a force-generating element to propel the striking head with energy which upon impacting on a spot on a lip or in an area around the lip increases blood flow to the spot on the lip or in the area around the lip which produces a lip plumping effect;
    a button that controls the force-generating element;
    and a computing device having stored thereon instructions configured to perform the steps:
    creating, by a computing device, a pre-altered lip style of a user;
    creating, by the computing device, a plurality of lip styles;
    creating, by the computing device, a questionnaire in which the user selects at least one lip style from the plurality of lip styles;
    and providing, by the computing device, instructions to the lip plumping device to plump the pre-altered lip style of the user to resemble the at least one lip style selected by the user, wherein the pre-altered lip style of the user is compared to the at least one lip style selected by the user from the plurality of lip styles, and based on physical differences of the pre-altered lip style with the at least one lip style selected by the user, the computing device calculates a plurality of target spots for striking, a number of strikes for each of the plurality of target spots, and a striking force for each of the plurality of target spots, to result in plumping of the pre-altered lip style to resemble the at least one lip style selected by the user, wherein lip style is related to fullness of lips.

2. The lip plumping device of claim 1, wherein the force-generating element is a spring, a compressed air cartridge or a gas cartridge, or an electro-magnetic actuator.

3. The lip plumping device of claim 1, wherein the force-generating element has settings to vary a force generated.

4. The lip plumping device of claim 1, comprising a communications module that communicates with the computing device.

5. The lip plumping device of claim 1, comprising a dial to increase and decrease a striking force of the striking head.

6. The lip plumping device of claim 1, wherein a striking force of the positive pressure device is controlled by instructions from the computing device.

7. The lip plumping device of claim 1, wherein the instructions are presented as a graphical image of the plurality of target spots.

8. The lip plumping device of claim 1, wherein the plurality of lip styles are recommended by the computing device based on one or more photos of the pre-altered lip style of the user.

9. The lip plumping device of claim 1, further comprising providing recommendations based in real-time video of the user.

10. The lip plumping device of claim 1, wherein the pre-altered lip style of the user is compared to the plurality of lip styles by the computing device.

11. A computing device, comprising at least a memory and processor, configured to:
    create a pre-altered lip style of a user;
    create a plurality of lip styles;
    create a questionnaire in which the user selects at least one lip style from the plurality of lip styles;
    provide instructions for a lip plumping device wherein the lip plumping device comprises:
    a positive pressure device having a striking rod and a striking head attached on an end of the striking rod;
    a force-generating element to propel the striking head with energy which upon impacting on a spot on a lip or in an area around the lip increases blood flow to the spot on the lip or in the area around the lip which produces a lip plumping effect;
    a button that controls the force-generating element;
    wherein the instructions are configured to define how to plump the pre-altered lip style of the user to resemble the lip style selected by the user, wherein the lip plumping device increases blood flow to the user's lips to cause swelling of the user's lips;
    and comparing the pre-altered lip style of the user to the at least one lip style selected by the user from the plurality of lip styles, and based on physical differences of the pre-altered lip style with the at least one lip style selected by the user, the computing device calculates a plurality of target spots for striking, a number of strikes for each of the plurality of target spots, and a striking force for each of the plurality of target spots, to result in plumping of the pre-altered lip style to resemble the at least one lip style selected by the user, wherein lip style is related to fullness of lips.

12. The computing device of claim 11, wherein the instructions are presented as a graphical image of the plurality of target spots.

13. The computing device of claim 11, wherein the plurality of lip styles are recommended by the computing device based on one or more photos of the pre-altered lip style of the user.

14. The computing device of claim 11, wherein the computing device is further configured to provide recommendations in real-time video of the user.

15. A system, comprising:
    a lip style analysis engine including computational circuitry configured to:
    create a pre-altered lip style of a user and a plurality of lip styles;
    a questionnaire analysis engine including computational circuitry configured to:
    provide a selection of at least one lip style from the plurality of lip styles; and an instruction engine including computational circuitry configured to:

provide instructions for a lip plumping device wherein the lip plumping device comprises:

a positive pressure device having a striking rod and a striking head attached on an end of the striking rod;

a force-generating element to propel the striking head with energy which upon impacting on a spot on a lip or in an area around the lip increases blood flow to the spot on the lip or in the area around the lip which produces a lip plumping effect;

a button that controls the force-generating element;

wherein the instructions are configured to define how to plump the pre-altered lip style of the user to resemble the lip style selected by the user, wherein the lip plumping device increases blood flow to the user's lips to cause swelling of the user's lips;

and compare the pre-altered lip style of the user to the at least one lip style selected by the user from the plurality of lip styles, and based on physical differences of the pre-altered lip style with the at least one lip style selected by the user, the computing device calculates a plurality of target spots for striking, a number of strikes for each of the plurality of target spots, and a striking force for each of the plurality of target spots, to result in plumping of the pre-altered lip style to resemble the at least one lip style selected by the user, wherein lip style is related to fullness of lips.

16. The system of claim 15, wherein the instructions are presented as a graphical image of the plurality of target spots.

17. The system of claim 15, further comprising a recommendation engine including computational circuitry configured to:

make recommendations of lip styles based on one or more photos of the pre-altered lip style of the user.

18. The system of claim 15, further comprising a recommendation engine including computational circuitry configured to:

make recommendations based in real-time video of the user.

* * * * *